Oct. 5, 1937.  W. D. SHAFFER  2,094,682

COMBINED WELL CONTROL GATE AND POWER DRIVE

Filed March 23, 1936

Inventor,
William D. Shaffer;
By
F. E. Maynard,
his atty.

Patented Oct. 5, 1937

2,094,682

UNITED STATES PATENT OFFICE 2,094,682

COMBINED WELL CONTROL GATE AND POWER DRIVE

William D. Shaffer, Brea, Calif.

Application March 23, 1936, Serial No. 70,373

2 Claims. (Cl. 137—139)

This invention is a combined well blow-out preventing, control gate and fast-acting, safety, power-operated actuator.

Deep wheel blow-out preventers of the type here shown have a pair of opposite gate members in a shell and are actuated by a pair of screw shafts which are cross-connected in a suitable manner so that when either shaft is turned, as commonly by a manually rotated hand wheel connected to one of the shafts both will rotate in unison and shift the gates to open or close in the shell chamber.

A serious objection to a manually operated means for shifting the gates, especially in a closing motion, is that the screw shaft action on the gates is much too slow. This slow closing action is undesirable in installations in a well subject to sudden rise in pressure.

Therefore, an object of this invention is to provide a quick-acting, power motivated wheel preferably close coupled with the control gate and further providing a safety feature for the protection of the mechanism against destruction or injury such as may result from the sudden stopping of the gates in their closing motion while the power driven wheel may be turning at a considerable speed with much energy, and while subjected to the pressure of the driving medium, which may be a jet of steam at as much as 300 pounds pressure.

A further object is to provide a drive means incorporating provision for connection of a remotely arranged actuating wheel of either manual or power operated type whereby to effect operation of the control gate from a remote station.

The invention consists of certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 1:
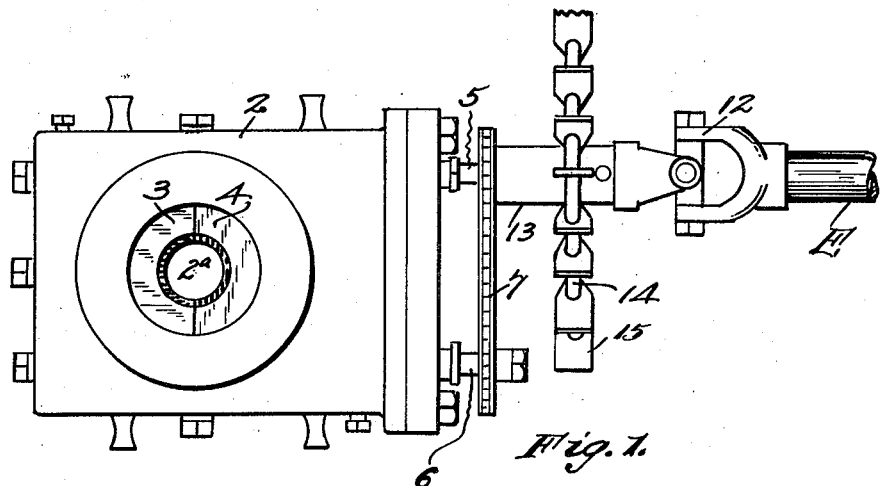
Figure 1 is a plan of a control gate and its close coupled, power-motivated drive wheel.
Figure 2:
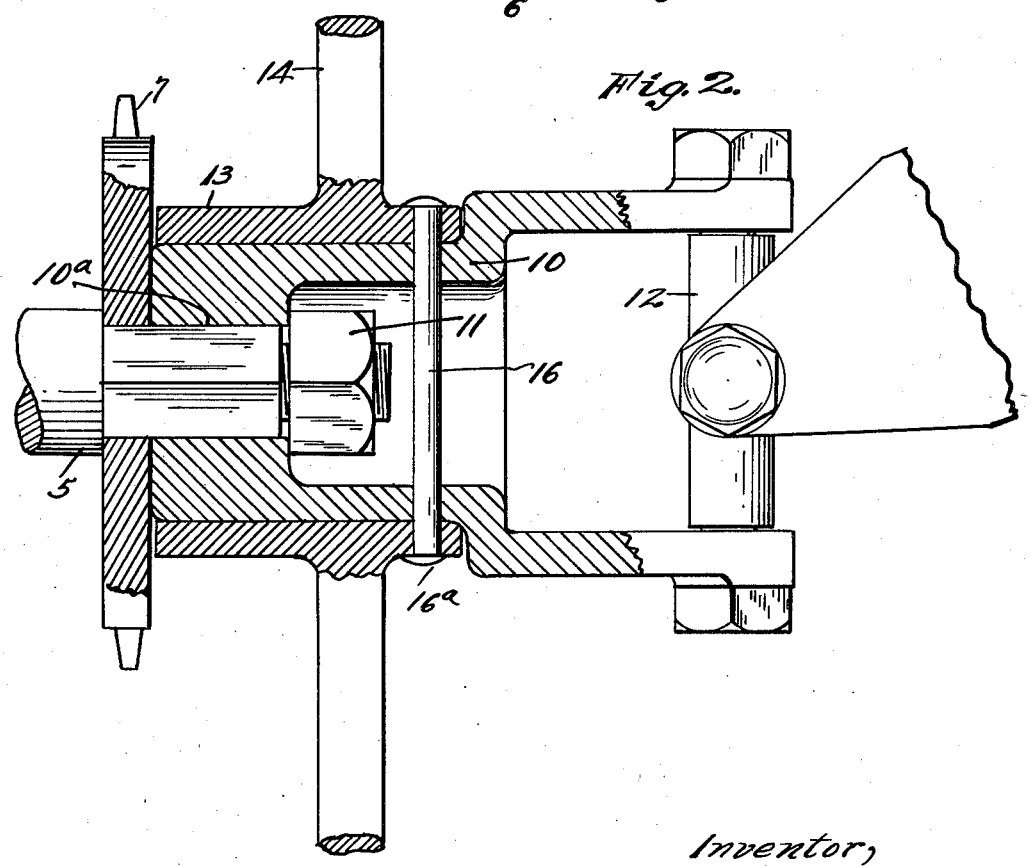
Figure 2 is an axial section of the wheel assembly.

The control gate includes a shell 2 suitably adapted for connection at its top and bottom in a well casing in a well known manner and having a through passage 2ª which is controlled by a pair of opposed gates 3 and 4 slidable into or from the passage by screw shafts 5 and 6 which project from one end of the shell and are suitably connected, as by sprocket means 7.

One of the shafts, as 5, has non-rotatively secured on its projecting end a mounting sleeve 10 retained by a nut 11 on the shaft end, which latter may be of square cross-section and snugly fit in a complementary, axial hole 10ª in the inner end of the sleeve 10.

The outer end of the sleeve 10 is provided with a universal joint 12 for the attachment of an extension shaft E of suitable type so that the close coupled sleeve 10, on shaft 5, may be operated by force applied rotatively on the far end of the extension shaft E.

The sleeve or mount 10 has its inner end made of cylindrical form for a suitable length and on this is mounted the hub 13 of a wheel 14 of suitable diameter and having a peripheral set of radial blades 15 to be impinged by a jet of fluid of considerable velocity and tangent to the wheel; as in a Pelton wheel motor.

A further feature of the invention is a yieldable, safety device whose function is to protect the control gate parts against injury which might result because of the sudden stopping of the gates, during closing effort, while the power driven wheel 14 is rapidly turning with much energy or, if stopped suddenly is still subject to pressure by the fluid, driving jet.

This safety is secured by a means which will yield or give way under a predetermined load or resistance and is preferably in the form of a shear piece or pin 16 fixed in and passing through the hub 13 of the wheel 14 and its mounting sleeve 10, which is fixed on the shaft 5. The pin 16 is here shown as extending through the wheel hub 13 and its mounting sleeve 10 diametrically from side to side and is retained in place by suitable means, as by heading over its ends at 16ª. Such a through pin 16 may be readily replaced by a new pin after a shearing has occurred.

The hub 13 is adapted to run free on the mounting sleeve 10 just as soon as the pin 16 is sheared off under the resistance set up by the gates as these are stopped in closing action and therefore the screw shafts of the control gate will be protected from injury under the driving energy of the fast running and jet impelled power wheel 14.

This combined control gate and its safety, power driven and close connected drive means is of simple and practical form, and highly efficient and reliable in driving and protecting the operative parts of the control gate.

What is claimed is:

1. In a well casing, control gate apparatus, a gate and an actuating shaft therefor, a housing for the gate and from which the shaft projects, a sleeve fixed to and projecting beyond the outer end of the shaft, a hubbed drive wheel mounted on the sleeve, and a shear pin passing clear of the shaft diametrically from side to side and through the wheel hub and the sleeve portion beyond the end of said shaft; whereby to free the wheel for rotation on the sleeve in event of overload on the pin, and whereby to facilitate renewal by replacing the single pin by another, like pin.

2. Well control gate apparatus including a gate device, a shaft connected to the device for operation thereof, a member non-turnably secured to and within which the shaft terminates, a driving wheel having a hub turnably mounted on said member, and a safety connection between the wheel hub and said member whereby the latter may be driven by power acting on the wheel; said connection including a shear pin adapted to give way under given load and release the wheel for rotation on the said member and said pin extending diametrically through the member and the hub and clear of the shaft end.

WILLIAM D. SHAFFER.